Patented Dec. 15, 1942

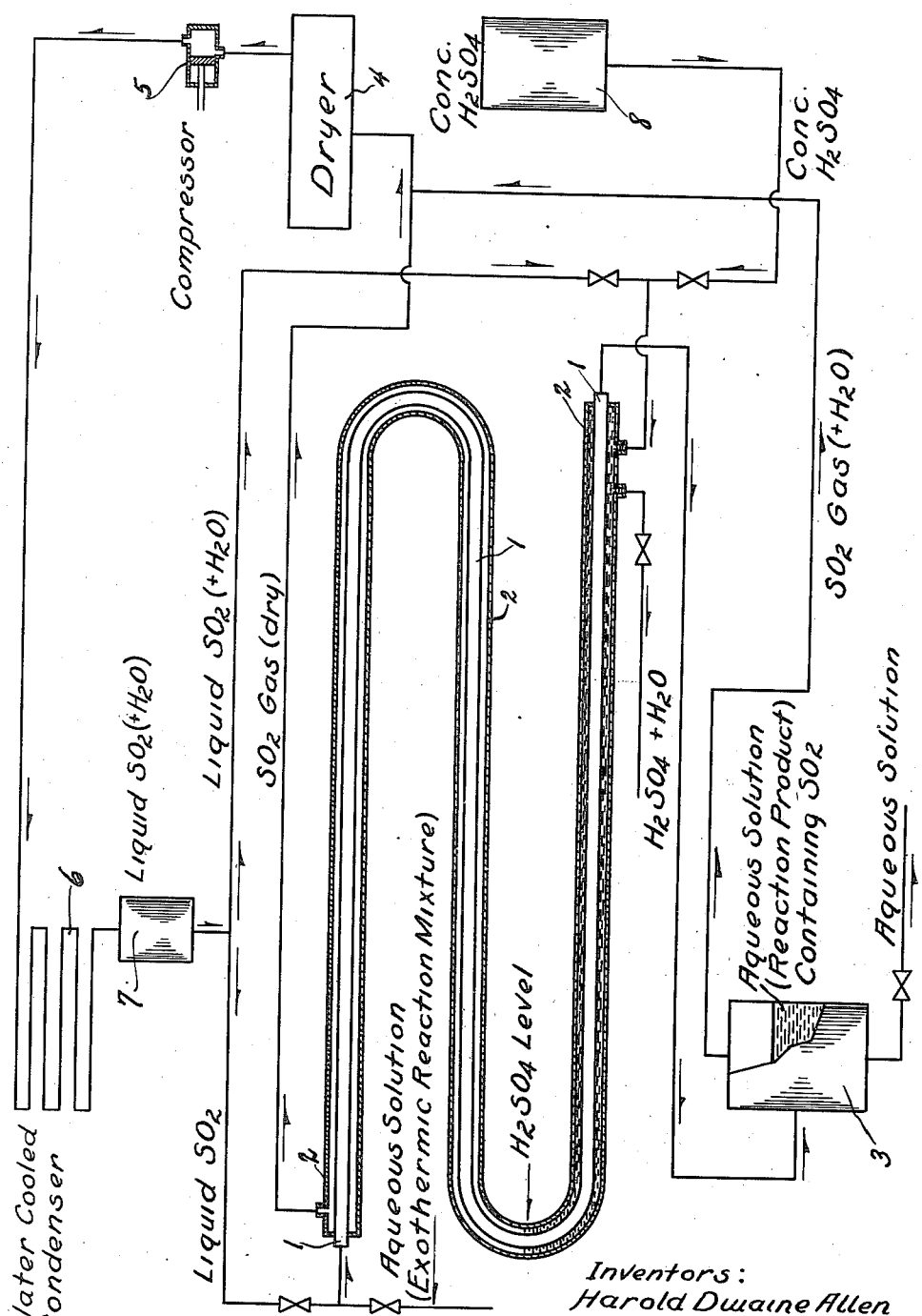

2,305,337

UNITED STATES PATENT OFFICE 2,305,337

REFRIGERATING PROCESS

Harold Dwaine Allen, Glen Rock, and Herbert Widener Andrews, Westfield, N. J., assignors to Colgate-Palmolive-Peet Company, Jersey City, N. J., a corporation of Delaware Application May 9, 1941, Serial No. 392,732

7 Claims. (Cl. 62—170)

The present invention relates to a process for drying refrigerants, especially refrigerants adapted to pass through metal cooling coils, and, more particularly, to a process for drying sulphur dioxide gas in steel refrigerating coils.

As is well known to those skilled in the art, various liquids of low boiling point are commonly used as refrigerants in refrigerating systems of many types. The refrigerant is introduced into heat exchange elements in liquid form and passes therethrough, taking up heat through the walls of the elements from the material to be cooled. The heat absorbed vaporizes the refrigerant, which leaves said elements as a gas. The gas is then compressed to a liquid and returned to the heat exchange elements.

Sulphur dioxide is one of the refrigerants most commonly employed for this purpose. One of the disadvantages in the use of sulphur dioxide, however, is that it readily picks up water and forms sulphurous acid, which is very corrosive to steels. When the system employed is a closed and independent one, little difficulty is experienced in this regard, as the sulphur dioxide, once dehydrated before introduction into the system, does not thereafter come into contact with water or water vapor. However, in other instances, as where the system is dual in that a common compressor is provided both for sulphur dioxide to be used as a refrigerant and for sulphur dioxide to be used as a solvent in contact with water or aqueous solutions, a considerable amount of water gets into the refrigerating system.

Such would be the case where a portion of the liquid sulphur dioxide effluent from the compressor is contacted with aqueous bodies and is recovered by vaporization and subsequent recondensation (or recompression) in a compressor together with gaseous sulphur dioxide from a refrigerating system. Although the sulphur dioxide employed as a solvent is preferably partially dried before passing to the compressor, no attempt need be made to remove all of the moisture present, as an amount no greater than about 0.3% does not cause appreciable corrosion. For this reason, some water is also concentrated and condensed and passes from the compressor to the cooling coils with the portion of the liquefied sulphur dioxide introduced therein. Then, upon evaporating the sulphur dioxide which is thus introduced into the coils for refrigeration, the water, which is comparatively non-volatile, is concentrated in the liquid phase and accumulates to form sulphurous acid in an amount which soon constitutes a corrosive proportion. Consequently, the use of sulphur dioxide has been considerably limited by the fact that it causes corrosion of steel cooling coils and pipes. While various suggestions and proposals have been made for overcoming this difficulty, none, so far as we are aware, has provided entirely satisfactory results.

We have found that this prior art problem can be simply and satisfactorily solved.

It is an object of our invention to provide a process for treating refrigerants to render them inert toward metal coils and pipes.

It is also an object of this invention to provide a process for drying a refrigerant comprising sulphur dioxide.

Our invention also contemplates the provision of a process for rendering sulphur dioxide, gas and liquid, anhydrous for continued use.

The invention also provides a cheap, easy and efficient process for preventing corrosion of refrigerating coils.

Other objects and advantages of the present invention will be apparent to those skilled in the art from the following description, taken in conjunction with the accompanying drawing, wherein:

Fig. 1 represents a flow diagram of a process in accordance with this invention, showing in relation to said process a refrigerating coil partly in section.

We have found that the introduction of sulphuric acid in the lower section of a refrigerating system with a refrigerant with which it has no reaction removes water from the refrigerant, rendering the same anhydrous. The sulphuric acid is thereby diluted and forms with the water a heavy liquid phase which remains in the lower portion of the refrigerating system. Since concentrated sulphuric acid is not corrosive to steel and since the amount of water removed from the refrigerant is insufficient to dilute the sulphuric acid down to the critical concentration below which it has a corrosive action upon steel, the presence of the sulphuric acid does not raise any difficulties in this regard. Moreover, the refrigerant passes from the sulphuric acid in an anhydrous state, thus eliminating any disadvantage which might be occasioned by the occurrence of water therewith.

Referring to Fig. 1, a refrigerating system comprising an inner coil 1 and a concentrically mounted outer coil 2 is provided. An aqueous exothermic reaction mixture is dissolved in liquid sulphur dioxide, which serves as an internal refrigerant, and the solution is passed into the upper end of the inner coil. The aqueous reaction product, together with contained sulphur dioxide, is withdrawn at the lower end of the inner coil to a receiver 3, and gaseous sulphur dioxide wet with water vapor is removed at the top of the receiver. The sulphur dioxide gas passes through a dryer 4, where it is partially dried to a moisture content no greater than about 0.3%, as set forth supra, and it is then compressed in a compressor 5, liquefied in a condenser 6, and collected in a tank 7.

Sulphur dioxide, the reactions of which with water have been described supra, is also employed as the external refrigerant and is introduced at the lower end of the outer cooling coils together with concentrated sulphuric acid from a supply tank 8. We have found that about 4 litres of concentrated sulphuric acid to about 11 litres of liquid sulphur dioxide provides a suitable proportion for this purpose. The concentration of the sulphuric acid is over about 75%, since lower concentrations are corrosive to steels, and we prefer to use sulphuric acid of about 94% concentration for greater efficiency and convenience and for a greater period of use without changing. It will be understood that concentrations higher than 94% can also be employed, fuming sulphuric acid or oleum also being suitable for our purpose.

The sulphuric acid, being the heavier liquid present and practically immiscible with the sulphur dioxide, remains at the bottom of the coils, and the liquid sulphur dioxide passes therethrough to the upper part of the refrigerating system, part of the sulphur dioxide being vaporized during such passage. In this manner, both liquid and gaseous sulphur dioxide are in intimate contact with the sulphuric acid. Before removal from the refrigerating coils, the sulphur dioxide is entirely vaporized and is thereafter merged with sulphur dioxide gas removed from receiver 3. It is compressed and liquefied in the condenser with only partially dried sulphur dioxide from receiver 3 and picks up water therefrom, then passing to the tank 7. The liquid sulphur dioxide in the tank, thus containing a small amount of water, is withdrawn in two streams. One of these streams is again mixed with the aqueous reaction mixture to be passed into the upper end of the inner coil 1, as aforesaid, and the other portion of liquid sulphur dioxide containing a small amount of water is returned to the lower portion of the outer coil, no additional sulphuric acid being added.

As a certain amount of water is carried into the refrigerating system from the compressor with each addition of liquid sulphur dioxide, the concentration of the sulphuric acid at the bottom of the outer cooling coil is continually decreased. Therefore, at the end of a few days, the concentration is usually at a point where it is desirable to replace the diluted sulphuric acid by a fresh amount of concentrated sulphuric acid. For this purpose, the sulphur dioxide is temporarily shut off, and the used sulphuric acid is drained from the coils. When the sulphur dioxide is again introduced, fresh concentrated sulphuric acid is also introduced into the coils therewith in sufficient amount to provide the required drying means. It will be appreciated that it is desirable to change the sulphuric acid when it reaches a concentration somewhat above the 75% concentration, below which it constitutes a corrosive menace to the metal cooling coils, as the efficiency of the sulphuric acid as a drying agent is accordingly diminished as it approaches this concentration.

While the present invention has been described with particular respect to the use of sulphur dioxide as a refrigerant, it will be understood by those skilled in the art that it also has applicability where other refrigerants are employed, when it is desired to dry these refrigerants. Such use of our process is confined, however, to employment with refrigerants which have no appreciable reaction with concentrated sulphuric acid. It is also preferable, although not essential, that the refrigerants used not be miscible in all proportions with sulphuric acid, so that a system having two liquid phases can be maintained. Those skilled in the art will recognize that among the other refrigerants suitable for drying by our novel process are carbon dioxide, butane, propane, dichlorodifluoromethane, carbon tetrachloride, chloroform, methyl chloride, liquid air, chlorine and hydrogen chloride.

In describing our invention with reference to the use of sulphur dioxide as a refrigerant, certain preferable proportions and concentrations have been mentioned. Those skilled in the art will realize that suitable changes may be made in these amounts, depending upon the refrigerant employed. It will also be apparent that equivalents of concentrated sulphuric acid as a drying agent can be employed in our process, their use also depending upon the refrigerant employed. Thus, while oleum can readily replace sulphuric acid for use with sulphur dioxide, it would not have as great adaptability with some other refrigerants. These and other variations and modifications are believed to be within the scope of the present specification and within the purview of the appended claims.

We claim:

1. A process of drying sulphur dioxide for use in refrigerating coils which comprises establishing in steel cooling coils a pool of a member of the group consisting of concentrated sulphuric acid and oleum, passing liquid sulphur dioxide containing moisture through said coils in contact with said pool, furnishing heat to the liquid sulphur dioxide to vaporize the same to gaseous sulphur dioxide, and removing the gaseous sulphur dioxide.

2. In a cyclical process of refrigerating by passing liquid refrigerants stable to at least one of concentrated sulphuric acid and oleum into steel cooling coils, vaporizing said refrigerants therein to form gaseous refrigerants, compressing said gaseous refrigerants in the presence of water vapor to form liquid refrigerants containing moisture, and returning said moisture-containing liquid refrigerants to the cooling coils, the improvement which comprises passing said liquid refrigerants into a member of the group consisting of concentrated sulphuric acid and oleum in said cooling coils.

3. In a cyclical process of refrigerating by passing liquid sulphur dioxide into steel cooling coils at the lower portion thereof, vaporizing sulphur dioxide therein to form gaseous sulphur dioxide, compressing the gaseous sulphur dioxide in the presence of water vapor to form liquid sulphur dioxide containing moisture, and returning said moisture-containing liquid sulphur dioxide to the cooling coils, the improvement which comprises passing said liquid sulphur dioxide into a pool of concentrated sulphuric acid in the lower portion of said coils.

4. In a cyclical process of refrigerating by passing liquid sulphur dioxide into steel cooling coils at the lower portion thereof, vaporizing sulphur dioxide therein to form gaseous sulphur dioxide, compressing the gaseous sulphur dioxide in the presence of water vapor to form liquid sulphur dioxide containing moisture, and returning said moisture-containing liquid sulphur dioxide to the cooling coils, the improvement which comprises establishing in the lower portion of the cooling coils a pool of sulphuric acid of sufficient concentration to be substantially non-corrosive to steel, passing therethrough the moist liquid sulphur dioxide, and removing said sulphuric acid pool before its dilution to a concentration corrosive to steel.

5. In a cyclical process of refrigerating by passing liquid sulphur dioxide into steel cooling coils at the lower portion thereof, vaporizing the liquid sulphur dioxide therein to form gaseous sulphur dioxide, compressing the gaseous sulphur dioxide in the presence of water vapor to form liquid sulphur dioxide containing moisture, and returning said moisture-containing liquid sulphur dioxide to the cooling coils, the improvement which comprises establishing in the lower portion of the cooling coils a pool of sulphuric acid of sufficient concentration to be substantially non-corrosive to steel, passing therethrough the moisture-containing liquid sulphur dioxide to dry the same, thereby diluting said sulphuric acid pool, and removing said sulphuric acid pool upon dilution to a concentration approaching about 75%.

6. In a cyclical process of refrigerating by passing liquid sulphur dioxide into steel cooling coils at the lower portion thereof, vaporizing said liquid sulphur dioxide therein to form gaseous sulphur dioxide, compressing the gaseous sulphur dioxide in the presence of water vapor to form liquid sulphur dioxide containing moisture, and returning said moisture-containing liquid sulphur dioxide to the cooling coils, the improvement which comprises establishing in the lower portion of the cooling coils a pool of sulphuric acid of about 94% concentration, passing therethrough the moist liquid sulphur dioxide to dry the same, thereby diluting said sulphuric acid pool, and removing said sulphuric acid pool upon dilution to a concentration approaching about 75%.

7. In a cyclical process of refrigerating by passing liquid sulphur dioxide into steel cooling coils at the lower portion thereof, vaporizing liquid sulphur dioxide therein to form gaseous sulphur dioxide, compressing the gaseous sulphur dioxide in the presence of water vapor to form liquid sulphur dioxide containing moisture, and returning said moisture-containing liquid sulphur dioxide to the cooling coils, the improvement which comprises introducing about four parts of sulphuric acid of about 94% concentration and about eleven parts of liquid sulphur dioxide containing moisture into the cooling coils, furnishing heat to said mixture in said cooling coils to vaporize the liquid sulphur dioxide and to leave the sulphuric acid unvaporized whereby the sulphuric acid is diluted by said moisture and whereby dried gaseous sulphur dioxide is formed, continuing to recirculate successively moistened portions of about eleven parts of liquid sulphur dioxide through said unvaporized sulphuric acid whereby the sulphuric acid is further diluted, and replacing said diluted sulphuric acid with about four parts of sulphuric acid of about 94% concentration.

HAROLD DWAINE ALLEN.
HERBERT WIDENER ANDREWS.